United States Patent [19]

Purdy

[11] 4,127,844
[45] Nov. 28, 1978

[54] VEHICLE STROBE WARNING LIGHT SYSTEM

[76] Inventor: Francis W. Purdy, 12000 Fairhill, Apt. 414, Cleveland, Ohio 44120

[21] Appl. No.: 780,356

[22] Filed: Mar. 23, 1977

[51] Int. Cl.² ............... B60Q 1/00; B60Q 1/44
[52] U.S. Cl. ........................ 340/71; 340/77; 340/81 R
[58] Field of Search ............ 340/66, 71, 72, 81 F, 340/81 R, 82, 87, 77

[56] References Cited

U.S. PATENT DOCUMENTS

| | | | |
|---|---|---|---|
| 2,078,573 | 4/1937 | Johnson | 340/105 |
| 2,731,584 | 1/1956 | Onksen, Jr. | 315/81 |
| 3,309,562 | 3/1967 | Schultz | 340/81 R |
| 3,382,405 | 5/1968 | Johnson | 315/80 |
| 3,441,906 | 4/1969 | Nielsen | 340/72 |
| 3,488,630 | 1/1970 | Decker et al. | 340/81 R |
| 3,501,742 | 3/1970 | Ellison | 340/71 |
| 3,641,491 | 2/1972 | Bath | 340/105 |
| 3,708,782 | 1/1973 | Mori | 340/71 |
| 3,784,974 | 1/1974 | Hamashige | 340/81 F |
| 3,875,561 | 4/1975 | Scarpino et al. | 340/81 R |
| 3,916,377 | 10/1975 | Demeter | 340/72 |

Primary Examiner—Donald J. Yusko
Attorney, Agent, or Firm—Watts, Hoffmann, Fisher & Heinke Co.

[57] ABSTRACT

The warning light system comprises a high-intensity, electronic flash lamp used in combination with a highway vehicle's conventional brake, turn signal, and emergency flasher light assemblies. The electronic flash lamp comprises a gas-filled lamp discharged across capacitors operating at about 800 to several thousand volts D.C. The flash lamp circuitry is tied into the existing brake light switch such that the capacitors will be discharged in response to actuation of the brake assembly when the brake initially is applied and the capacitors will not be discharged again until the brake assembly is actuated again. The resultant high-voltage pulse initiates a brilliant flash which lasts micro-seconds and which warns following drivers of an impending vehicle stop or slow-down. The high-intensity flash lamp circuitry also is tied into the turn signal and emergency flasher light assemblies so that a more positive indication of an impending turn or emergency is provided.

19 Claims, 2 Drawing Figures

VEHICLE STROBE WARNING LIGHT SYSTEM

BACKGROUND OF THE INVENTION

1. Field of the Invention

The invention relates to vehicle warning light systems and, more particularly, to a warning light system employing a high-intensity flash lamp.

2. Description of the Prior Art

Prior art vehicle warning light systems commonly comprise a taillight assembly, a headlight assembly, a turn signal assembly, and an emergency flasher assembly, all employing incandescent light bulbs. Each of these assemblies operates in a well-known manner to illuminate the roadway, to indicate an impending stop or slow-down, to indicate an impending turn, or to indicate an emergency condition of some nature.

The conventional vehicle warning light system suffers from certain drawbacks under modern driving conditions. For example, the Interstate network of highways is sufficiently complete that it is possible in many cases to drive at relatively high speed for an extended period of time. Particularly near large cities, traffic congestion occurs and it is very common for a large number of cars to travel at high speed without adequate spacing between cars. Accordingly, if a given vehicle should be required to stop suddenly or slow-down rapidly, the following vehicle too frequently impacts the vehicle preceding the following driver was not warned adequately of the impending stop or slow-down and, hence, could not initiate a braking operation or other evasive maneuver quickly enough. A similar result often happens when a given vehicle makes a turn, because the turning vehicle's turn signal lights may not adequately warn the following driver of the maneuver about to be executed. In short, conventional warning light systems employing incandescent light bulbs often fail to achieve their desired ends.

The problem primarily is one of sufficiently stimulating the following driver so that he immediately is aware that the preceding vehicle is about to stop, slow-down, or turn. Accordingly, if the following driver is alerted to the situation at hand, appropriate action may be taken to avoid a collision.

Prior art approaches to the problem have had certain drawbacks. For example, U.S. Pat. No. 3,258,746 discloses an automotive anti-collision beacon employing a high-voltage, gas-filled, electronic discharge lamp used in combination with a conventional stoplight so that the high-voltage lamp will be discharged only under certain conditions of vehicle deceleration. Alternatively, a plurality of G-sensitive switches set at different deceleration levels may be employed to flash separate high-intensity lamps progressively as a function of the rate of deceleration. The deficiencies of this type of system arise from the very nature of the switch employed to discharge the lamps. For example, riding on a rough road quite easily could flash the high-intensity lamp, thus giving a false indication of an impending stop. Conversely, if a stop is not made sufficiently rapidly, the lamp never will flash, thus failing to provide a warning to a following driver. These problems are exacerbated by driving uphill, downhill, or around curves.

Another approach to the problem is shown by U.S. Pat. No. 2,751,575, wherein an emergency incandescent light is disposed at the rear of the vehicle and is employed in conjunction with the conventional stoplight system. Depending upon whether the headlights are illuminated, the emergency light is illuminated either by a G-sensitive mercury switch or by extremely heavy brake pedal pressure. In one embodiment, the emergency light remains illuminated until the brake pedal pressure is released. One of the chief drawbacks of this system is that the emergency light is not illuminated until a panic-stop condition is approached. Accordingly, it very well may be too late to warn a following driver and this system would fail to achieve its goals. Moreover, once the emergency light is illuminated, it remains illuminated until the brake pedal pressure is released. Because a conventional incandescent lamp is employed, it is quite possible that a following driver's attention will not be captured in any event because (1) the intensity of the lamp is relatively low, and (2) the constant illumination of the emergency lamp provides little stimulus to a following driver.

Other examples of vehicle warning systems could be given. In each case, however, the system fails to provide an adequate warning to the following driver at the initiation of a vehicle operation so that the following driver can take appropriate evasive action.

SUMMARY OF THE INVENTION

The present invention provides a vehicle warning light system which overcomes many of the drawbacks of prior art systems. A high-intensity, electronic flash lamp is mounted to a vehicle and is used in combination with the vehicle's conventional brake, turn signal, and emergency flasher light assemblies. The electronic flash lamp comprises a gas-filled lamp discharged across capacitors operating at about 800 to several thousand volts D.C. The flash lamp circuitry is tied into the existing brake light switch such that the capacitors will be discharged in response to actuation of the brake assembly when the brake initially is applied and the capacitors will not be discharged again until the brake assembly is actuated again. The resultant high-voltage pulse initiates a brilliant flash which lasts micro-seconds and which warns following drivers of an impending vehicle stop or slow-down. The high-intensity flash lamp circuitry also is tied into the turn signal and emergency flasher light assemblies so that a more positive indication of an impending turn or emergency is provided.

DESCRIPTION OF THE PREFERRED EMBODIMENT

Figure 1:
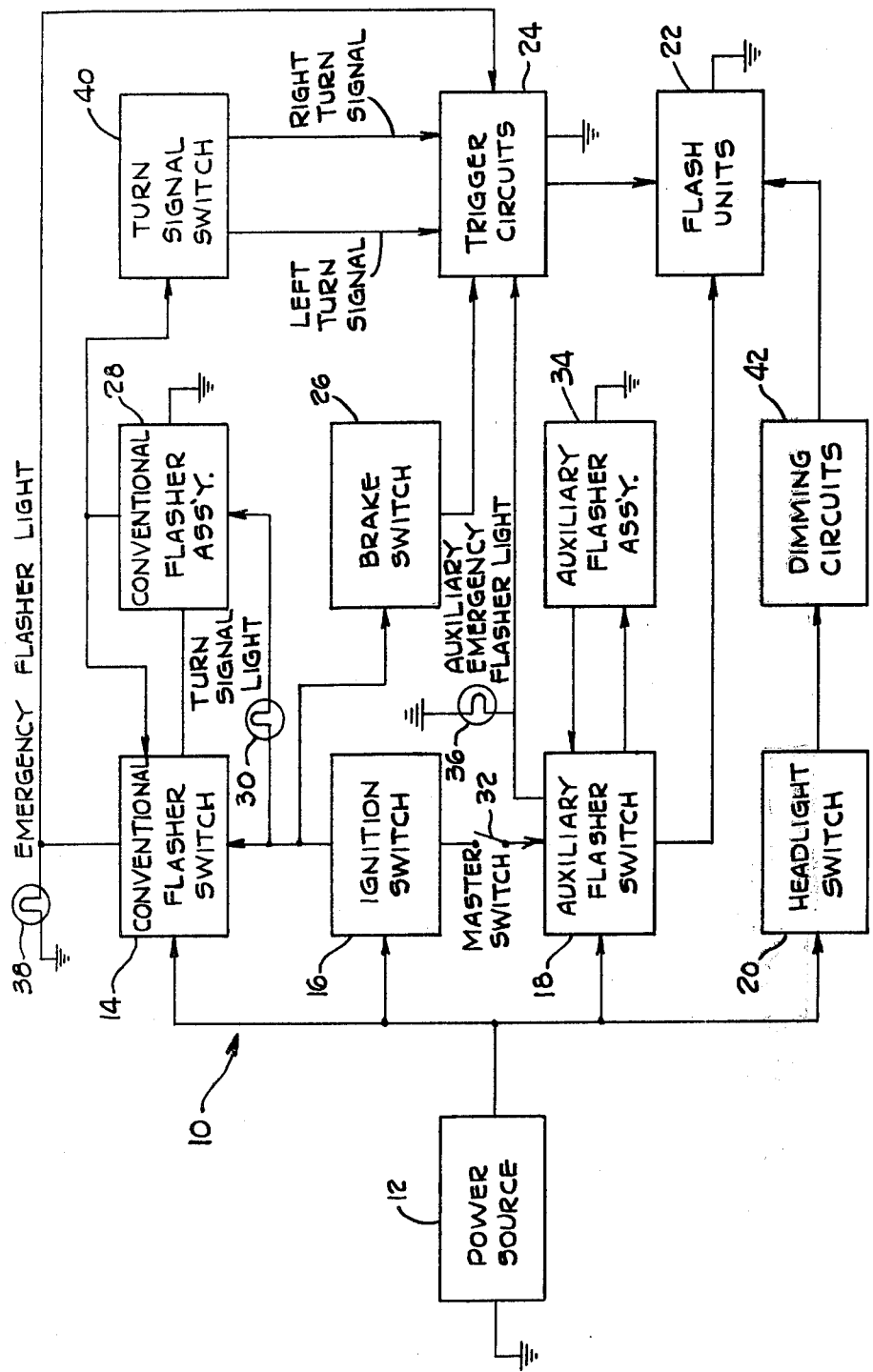
FIG. 1 is a flow chart showing key components of the system and a preferred arrangement.

FIG. 1 is a flow chart of one form of the invention showing a vehicle warning light system 10 as it might be used in a typical highway vehicle. As far as possible, the conventional vehicle headlight assembly, taillight assembly, turn signal assembly, emergency flasher assembly, and brake assembly are employed unmodified. For example, electrical power is provided by a conventional storage battery or power source 12 supplemented as necessary by a conventional electrical generating system (not shown).

From the power source 12, electrical current is directed to a conventional flasher switch 14, an ingnition switch 16, an auxiliary flasher switch 18, and a headlight switch 20. From these components, electrical current is directed ultimately to a plurality of flash units 22 and a plurality of corresponding trigger circuits 24. The flash units 22 will be described in detail subsequently, but for the present it will suffice that each flash unit 22 is comprised of a high-voltage, gas-filled, electronic discharge tube capable of producing an intense light of short duration. The trigger circuits 24 are comprised of components capable of activating the electronic discharge tube upon command.

From the ignition switch 16, electrical current flows to the conventional flasher switch 14 as well as to a turn signal indicator light 30. Electrical current also flows from the ignition switch 16 through a master switch 32 to the auxiliary flasher switch 18. The master switch 32 may be employed by the operator of the vehicle to disconnect the auxiliary portion of the warning light system 10.

From the power source 12, electrical current may flow to the flash units 22 either through the ignition switch 16 (auxiliary flasher switch 18 OFF and master switch 32 closed) or through the auxiliary flasher switch 18 (auxiliary flasher switch 18 ON). With the auxiliary flasher switch 18 in the OFF position, electrical current to activate the trigger circuits 24 in the mode of operation will flow from the power source 12, through the ignition switch 16 to the brake switch 26, and thence to the trigger circuits 24. With the auxiliary flasher switch in the ON position, electrical current to activate the trigger circuits 24 will flow from the power source 12, through the auxiliary flasher switch 18, to an auxiliary flasher assembly 34. From the auxiliary flasher assembly 34, the current is returned to the flasher switch 18 in pulses where it then is sent to the trigger circuits 24 and an auxiliary emergency flasher indicator light 36.

With the flasher switch 14 in the OFF position, electrical current is directed from the ignition switch 16, through the flasher switch 14, to the flasher assembly 28. The flasher assembly 28 may be of any well-known construction and, when activated by electrical current received from the flasher switch 14, provides a pulsed output signal of approximately 60 to 100 cycles per minute, preferably 100 cycles per minute.

With the flasher switch 14 in the ON position, electrical current is taken from the power source 12 and directed to the flasher assembly 28, where it is pulsed and returned to the flasher switch 14. From the flasher switch 14, the current then is distributed to the trigger circuits 24 and an emergency flasher indicator light 38.

With the flasher switch 14 in the OFF position, the flash units 22 may be activated by operation of a turn signal switch 40, as well as by the brake switch 26. If either a left turn signal or a right turn signal command is given, electrical current is drawn through the flasher assembly 28 and then is directed to the turn signal switch 40. From the switch 40, the current then is directed appropriately to the trigger circuits 24.

If the ignition switch 16 is in the ON position, the brake switch 26 may activate the flash units 22. As the brake pedal is depressed initially, the brake switch 26 is closed, thus routing electrical current from the power source 12 through the ignition switch 16, through the brake switch 26, and thence to the trigger circuits 24.

The warning light system 10 also includes a plurality of dimming circuits 42. The dimming circuits 42 are connected intermediate the headlight switch 20 and the flash units 22 and operate under certain conditions to decrease the amount of electrical current flowing to the flash units 22. For example, when the headlight switch 20 is in the OFF position, electrical current will flow undiminished to the flash units 22. When the headlight switch 20 is in the ON position, as in normal nighttime driving, the dimming circuits 42 operate to decrease the amount of electrical current flowing to the flash units 22 so as to decrease the intensity of the light emanating from the flash units 22. The dimming circuits 42 alternatively may switch the electrical current to a second set of flash units having lesser intensity or to a second set of flash units disposed behind an intensity-reducing lens. The dimming circuits 42 also could cause an intensity-reducing lens or filter to be moved in front of each flash unit 22. Preferably, however, the dimming circuits 42 either switch the electrical current to a set of capacitors disposed within the flash units 22 of lesser capacity than the normal capacitors used in the flash units 22, or route the electrical current through resistors prior to reaching the flash units 22. Many variations are possible but the object is the same, that is, to reduce the intensity of the light emanating from the flash units under nighttime driving conditions so as to avoid temporarily blinding the driver of a following vehicle.

Figure 2:
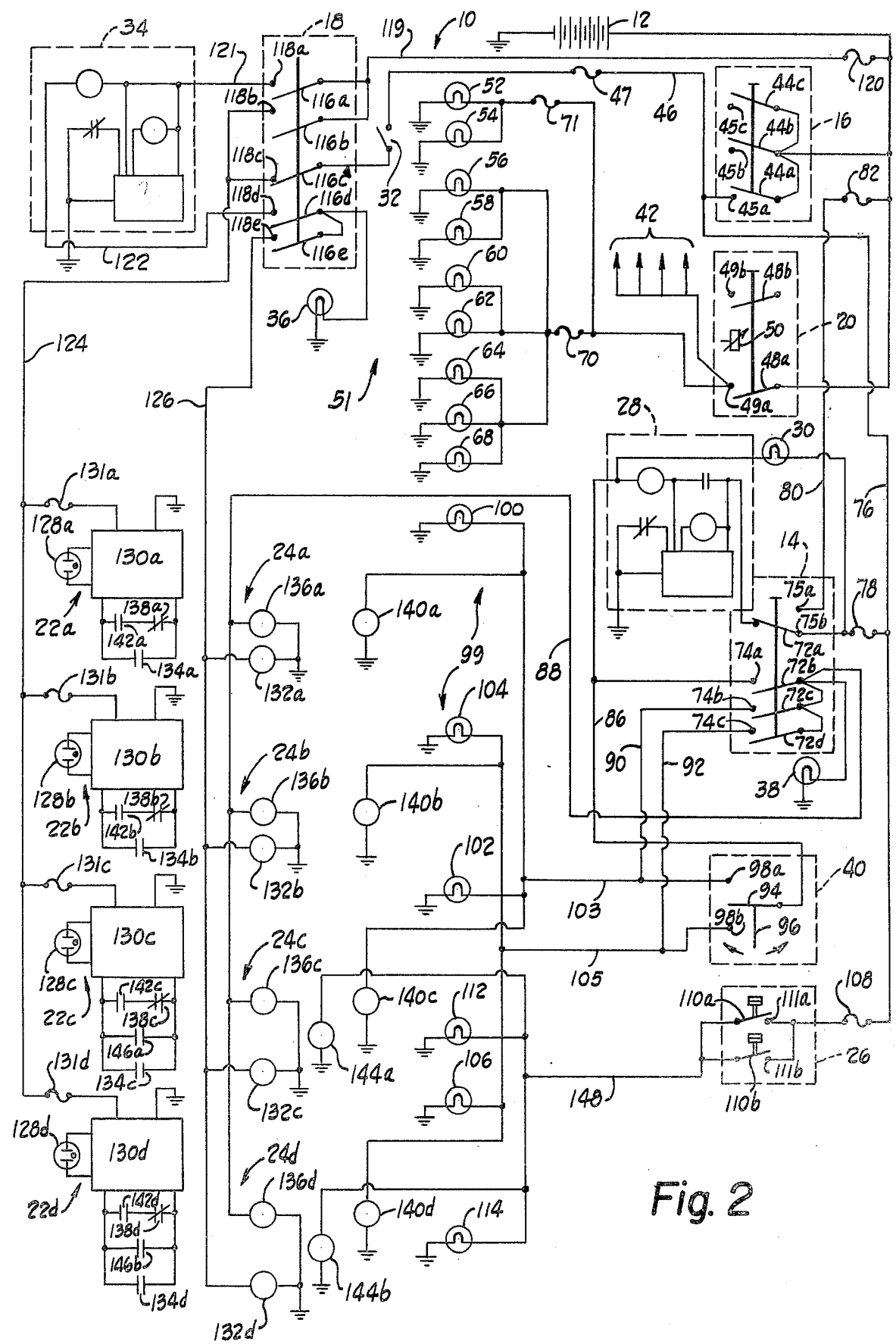
FIG. 2 is a schematic representation of one form of the invention employing a plurality of electronic flash units.

The vehicle warning light system 10 is shown in greater detail in FIG. 2. Certain of the components of FIG. 2 that have been identified in FIG. 1, such as the ignition switch 16 and the auxiliary flasher switch 18 are indicated by the dashed lines. The ignition switch 16, for example, includes a plurality of movable contacts 44a, 44b, and 44c which engage a plurality of output contacts 45a, 45b and 45c. With the ignition switch 16 in the ON position, electrical current is conducted from the power source 12 through the ignition switch 16, through the now-closed contacts 44a, 45a and thence to the master switch 32 via a lead line 46.

The headlight switch 20 includes a pair of movable contacts 48a, 48b which engage a pair of output contacts 49a, 49b, as well as a rheostat 50 for the dimming of interior lights. With the headlight switch 20 in the ON position, electrical current is drawn from the power source 12, through the now-closed contacts 48a, 49a, and thence to the dimming circuits 42 and a plurality of incandescent lights 51. The lights 51 comprise a significant portion of the highway vehicle's conventional exterior lighting system. The lights 51 include a lamp 52 for the left taillight, lamp 54 for the left rear side-marker light, lamp 56 for the left front parking light, and lamp 58 for the left front side-marker light. On the right side of the vehicle, lamp 60 is for the right front side-marker light, lamp 62 is for the right front parking light, lamp 64 is for the right rear side-marker light, and lamp 66 is for the right taillight. Lamp 68 illuminates the license plate. Fuses 70 and 71 are disposed intermediate the lights 51 and the power source 12 to protect the system in the event of a short circuit.

The conventional flasher switch 14 includes a plurality of movable contacts 72a, 72b, 72c, and 72d; a plurality of output contacts 74a, 74b, and 74c; and a pair of input contacts 75a, 75b. With the flasher switch 14 in the OFF position, contacts 72a and 75b are engaged and, because contact 75b is connected to contact 45a of the ignition switch 16 via a lead line 76, electrical current does not flow to the flasher switch 14 unless the ignition switch 16 is in the ON position. A fuse 78 is disposed intermediate the contacts 45a and 75b to protect the system in the event of a short circuit. With the flasher switch 14 in the ON position, contacts 72a and 75a are engaged and electrical current flows directly from the power source 12 to the flasher switch 14 via a lead line 80. A fuse 82 is included as part of the lead line 80 to protect the system in the event of a short circuit.

The flasher switch 14 is connected to the conventional flasher assembly 28 via the movable contact 72a which engages either of contacts 75a, 75b. It is intended that a conventional flasher assembly 28 may be employed unmodified as now exist in many vehicles. Essentially, the function of the flasher assembly 28 is to receive an electrical input signal from the contact 72a and, in response to that input signal, provide a pulsed output signal of approximately 60 to 100 cycles per minute. As long as a flasher assembly 28 performs this function, no modifications are necessary to install the auxiliary portion of the warning light system 10.

A lead line 86 conducts the output of the flasher assembly 28 to the contact 74a included as part of the flasher switch 14 and to an input side of the turn signal switch 40. The turn signal indicator light 30 also is connected intermediate the contact 75b and the lead line 86 to provide a visual indication to the operator of the vehicle that electrical current is being drawn through the lead line 86 and, hence, the flasher assembly 28 is operating. In turn, the flasher assembly 28 can operate only if the turn signal switch 40 is closed, or if the flasher switch 14 is in the ON position.

With the flasher switch 14 in the ON position, the contacts 72b, 74a are closed and pulsed electrical signals from the flasher assembly 28 are conducted to the trigger circuits 24 via a lead line 88 as well as to the emergency flasher indicator light 38. Electrical current also is conducted internally of the flasher switch 14 to the now-closed contacts 72c-74b and 72d-74c, where it then flows through a pair of lead lines 90, 92 to the left side of the turn signal system and the right side of the turn signal system, respectively.

Referring to the turn signal switch 40, a pivotally mounted contact 94 includes a lever 96 extending outwardly of the vehicle's steering column. When the operator wishes to indicate an impending turn, the lever 96 may be moved in the appropriate direction and the contact 94 will engage either of contacts 98a, 98b included as part of the turn signal switch 40. When this occurs, electrical current will be drawn through the output lead line 86 of the flasher assembly 28 and directed to appropriate components of the turn signal assembly.

The left turn signal assembly includes a plurality of incandescent lights 99. The lights 99 include a lamp 100 for the left front turn signal light and a lamp 102 for the left rear turn signal light. Both of the lamps 100, 102 are connected to the contact 98a by a lead line 103 and are illuminated when the contacts 94, 98a are closed to indicate a left turn. The lights 99 also include a lamp 104 for the right front turn signal light and a lamp 106 for the right rear turn signal light. Both of the lamps 104, 106 are connected to the contact 98b by a lead line 105 and are illuminated when the contacts 94, 98b are closed to indicate a right turn.

The brake switch 26 also is connected to the ignition switch 16 via the lead line 76, and a fuse 108 is disposed intermediate the brake switch 26 and the ignition switch 16 to prevent damage to the system in the event of a short circuit. The brake switch 26 includes a pair of movable contacts 110a, 110b actuated by the dual hydraulic cylinders included as part of a vehicle's conventional master brake cylinder as well as a pair of contacts 111a, 111b. The contacts 110a, 110b are wired in parallel so that electrical current will be conducted through the brake switch 26 in the event either one of the contacts 110a, 110b or their associated hydraulic cylinders fails to operate. It also will be appreciated that the brake switch 26 could be actuated directly by a brake pedal (not shown). Whatever mechanism is employed to actuate the brake switch 26 is irrelevant to the invention, provided the switch 26 is actuated at the initiation of a braking operation. Normally, of course, this would occur as the brake pedal initially is depressed.

As with other portions of the vehicle exterior lighting system, the brake system includes a plurality of incandescent lights. Lamp 112 is for the left brake light and lamp 114 is for the right brake light. The components of the vehicle warning light system 10 described heretofore largely are conventional and operate in a well-known manner to indicate various vehicle functions such as an impending stop, turn, or emergency. The auxiliary components of the vehicle warning light system 10 now will be described.

The auxiliary flasher switch 18 includes a plurality of movable contacts 116a, 116b, 116c, 116d, and 116e. The flasher switch 18 also includes a plurality of output contacts 118a, 118b, 118c, 118d, and 118e. With the flasher switch 18 in the OFF position, only the contacts 116c, 118c are engaged. With the flasher switch 18 in the ON position, the remaining contacts are engaged, and the contacts 116c, 118c are disengaged. The contacts 116a, 116b receive electrical current directly from the power source 12 via a lead line 119. Fuses 47 and 120 are disposed intermediate the power source 12 and the contacts 116c, and 116a, 116b, respectively, to protect elements of the system in the event of a short circuit.

The auxiliary flasher assembly 34 receives electrical current from the flasher switch 18 via a lead line 121 connected to the contact 118a. The pulsed output signal from the flasher assembly 34 is conducted to the contact 118d of the flasher switch 18 via a lead line 122. The contacts 118b, 118c are connected to each of the flash units 22 via a lead line 124 and contact 118e is connected to each of the trigger circuits 24 via a lead line 126. Other components of the trigger circuits 24 are connected to the flasher switch 14 via the lead line 88 and still other components of the trigger circuits 24 are connected to the contacts 98a, 98b of the turn signal switch 40 and the contacts 110a, 110b of the brake switch 26.

For maximum effectiveness, the flash units 22 preferably are activated approximately 30 times per minute to indicate an emergency and the flasher assembly 34 accordingly must operate with a frequency of 30 cycles per minute. Assuming that the flash units 22 and the trigger circuits 24 can recharge in 1.6 seconds, the flasher assembly 34 should pulse about 0.3 second in the ON mode and 1.7 seconds in the OFF mode. Under these conditions, the flash unit and trigger circuit capacitors and relays will be charged completely and discharged completely while providing the required flash frequency of 30 cycles per minute.

The flash units 22 are mounted to the vehicle near the corners of the vehicle and within, or adjacent, the conventional taillight and headlight or turn signal assemblies. For example, the flash unit 22a is disposed at the left front of the vehicle, the flash unit 22b is disposed at the right front of the vehicle, the flash unit 22c is disposed at the left rear of the vehicle, and the flash unit 22d is disposed at the right rear of the vehicle.

Each flash unit 22 comprises a gas-filled lamp 128 connected to an electronic device 130 for increasing low D.C. voltage to high D.C. voltage for capacitor storage. Typically, the capacitors included as part of the device 130 operate at about 800 to several thousand volts D.C. The device 130 is powered by the power source 12 via the various lead lines and requires approximately 6 to 10 volts. Fuses 131 are disposed intermediate the power source 12 and each device 130 to protect elements of the system in the event of a short circuit. Typically, a commercially available electronic flash unit 22 will produce a minimum output of 15,000 lumen-seconds, a burning period of approximately 30 milliseconds, and a minimum intensity of approximately 500,000 lumens. A flash unit 22 having these characteristics and having an input of approximately 7.5 volts will be able to recharge within about 1.6 seconds, ± 0.1 second. With this recharge time and with the minimum voltage available, the flash unit 22 will be able to produce the high-intensity burning flash indefinitely.

The trigger circuits 24 comprise a plurality of contacts and associated relays which operate in combination with the components included as part of the electronic device 130 to discharge the gas-filled lamp 128. Relay coils 132a, 132b, 132c, and 132d each receive electrical current from the lead line 126 and each actuates an associated, normally open set of contact 134a, 134b, 134c, and 134d, respectively. In a similar manner, each of the trigger circuits 24 includes a coil relay 136 receiving electrical current from the lead line 88 and actuating an associated, normally closed contact 138. Each of the trigger circuits 24 also includes a coil relay 140 receiving electrical current from the lead lines 103, 105 and actuating an associated, normally open contact 142. The normally open contacts 142 are in series with the normally closed contacts 138, and both the contacts 138, 142 are in parallel with the normally open contacts 134. The relays 136 associated with the normally closed contacts 138 are faster-acting than the relays 140 associated with the normally open contacts 142 so that the contacts 138 always open faster than the contacts 142 can close.

The relays 140a, 140c are associated with the left side flash units 22a, 22c and, accordingly, receive electrical current either through the left turn signal contact 98a included as part of the turn signal switch 40 or through lead line 90 and the contact 74b included as part of the flasher switch 14. The relays 140b, 140d are associated with the right side flash units 22b, 22d, and, accordingly, receive electrical current either through the right turn signal contact 98b included as part of the turn signal switch 40 or through the lead line 92 and contact 74c included as part of the flasher switch 14.

The trigger circuits 24c, 24d are associated with the left rear and the right rear flash units 22c, 22d, respectively, and are actuatable by the brake switch 26. To this end, a coil relay 144a, 144b is included as part of the trigger circuits 24c, 24d, respectively. The relays 144a, 144b actuate an associated set of normally open contacts 146a, 146b, respectively. The contacts 146a, 146b are in parallel with the other contacts associated with the flash units 22c, 22d. The relays 144a, 144b receive electrical current from the contacts 110a, 110b of the brake switch 26 via a lead line 148.

OPERATION

1. Brake System

A. Under normal driving conditions, the ignition switch 16 is in the ON position and the two flasher switches 14, 18 are in the OFF position. Under these circumstances, electrical current from the power source 12 is supplied to the flash units 22 via the lead line 46, the master switch 32, the contacts 116c, 118c, and the lead line 124. Accordingly, the compacitors in the electronic devices 130 are charged to capacity as the vehicle is being operated.

B. When the vehicle brake pedal is depressed, hydraulic pressure in the master brake cylinder closes the dual contacts 110a, 110b and 111a, 111b in the brake switch 26.

C. Current from the power source 12 then flows through the ignition switch 16 via the lead line 76 to the brake lights 112, 114, via the lead line 148.

D. The relays 144a, 144b also are energized by current flowing in the lead line 148. In turn, the normally open contacts 146a, 146b are closed, completing the trigger circuits 24c, 24d. Upon this occurence, the rear flash lamps 128c, 128d are caused to flash once.

E. As long as the brake switch 26 remains closed, the coils 144a, 144b remain energized and the contacts 146a, 146b remain closed. Hence, the capacitors in the electronic devices 130c, 130d cannot recharge and no additional high-intensity flashes are possible until the brake switch 26 is open for at least the 1.6 seconds required to recharge the flash unit capacitors. A continuous breaking operation results only in a single flash from the lamps 128c, 128d, and multiple flashes cannot occur in a brake-pumping operation unless at least 1.6 seconds elapse between brake pedal applications.

2. Turn Signal System

A. Again assuming normal driving conditions, the flash units 22 are charged as described above. Electrical current also flows through the ignition switch 16 via the lead line 76 to the flasher switch 14. Electrical current then flows through the contacts 72a, 75b to the flasher assembly 28.

B. Upon actuation of the turn signal lever 96, a circuit is completed through the contact 94 and either of the contacts 98a, 98b. The flasher assembly 28 commences to pulse and the turn signal indicator light 30 is illuminated periodically. In the event a left turn signal is called for, parallel circuits illuminate the left front and left rear turn signal lights 100, 102. In the event a right turn signal is called for, parallel circuits illuminate the right front and right rear turn signal lights 104, 106.

C. By way of example, assuming that a left turn signal has been called for, the relays 140a, 140c will be energized. Hence, the normally open contacts 142a, 142c will be closed.

D. Due to the characteristics of the flasher assembly 28, the turn signal lights are illuminated for about 0.3 second and shut off for about 0.3 second. As long as the turn signal lever 96 causes the contact 94 to engage either of the contacts 98a, 98b, the appropriate relays 140 also energized and deenergized with this frequency. Consequently, the associated normally open contacts 142 also are opened and closed with this frequency.

E. When the contacts 142 first are closed, the trigger circuits 24 cause the lamps 128 to flash once at the first impulse.

F. Because the flash unit capacitors require approximately 1.6 seconds to recharge, and the trigger circuits 24 are activated every 0.3 second, the electronic devices 130 cannot recharge completely. The second and subsequent trigger circuit pulses will cause only the partial charges on the capacitors in the electronic devices 130 to be dissipated without usual effect.

3. Conventional Emergency Flasher System

A. In this mode of operation, the flasher switch 14 is in the ON position and the ignition switch 16 may be in either the ON position or the OFF position. Regardless of the position of the ignition switch 16, the contacts 72a, 75a in the switch 14 will be engaged, and electrical current then will be directed from the power source 12 via the lead line 80 to the flasher assembly 28.

B. The contacts 74a–72b, 74b–72c, and 74c–72d also will be closed and current will be drawn through the lead line 86 and distributed through the flasher switch 14 to all of the turn signal lights 100, 102, 104, 106. This will be accomplished irrespective of the position of the turn signal lever 96. Also, the emergency flasher indicator light 38 will be illuminated periodically.

C. A circuit also is completed via the lead line 88 to the relays 136. In turn, the normally closed contacts 138 are opened. Because each normally closed contact 138 opens faster than its normally open series companion can close, none of the trigger circuits 24 will be energized. Accordingly, none of the trigger circuits 24 will be activated and none of the lamps 128 will flash.

4. Auxiliary Emergency Flasher System

A. In this mode of operation, the auxiliary flasher switch 18 is in the ON position, the flasher switch 14 is in the OFF position, and the ignition switch 16 may be either in the ON position or the OFF position. All of the contacts 116 engage the contacts 118, except for the contacts 116c, 118c which are disconnected.

B. Electrical current flows directly from the power source 12 via the lead line 119 to the flasher switch 18. From there, electrical current flows to the auxiliary flasher assembly 34 via the contacts 116a, 118a and the lead line 121. The flash units 22 are energized via the contacts 116b, 118b and the lead line 124.

C. Pulses from the flasher assembly 34 are directed via the lead lines 122 and 126 to the relays 132. Each pulse of the flasher assembly 34 causes each normally open contact 134 to close, thus triggering each electronic device 130 to flash the lamps 128. Also, the auxiliary emergency flasher indicator light 36 is illuminated with each pulse from the flasher assembly 34.

D. Because the flasher assembly 34 pulses ON for 0.3 second and OFF for 1.7 seconds, the capacitors within the electronic device 130 are given sufficient time to recharge between discharges.

5. Combined Conventional and Auxiliary Emergency Flasher Systems

A. In this mode of operation, both the flasher switches 14, 18 are in the ON position and the auxiliary emergency flasher system will supplement the conventional flasher system. As described previously, the lights 100, 102, 104, and 106 will be illuminated every 0.6 second. The high-intensity lamps 128 will be discharged every 2.0 seconds when the flasher switch 18 is in the ON position. Because the periods of charge/discharge of the two systems are different, the incandescent bulbs and the gas-filled lamps are discharged out-of-phase with each other and the visual-stimulating characteristics of the combined systems are greatly enhanced over either system employed alone.

B. Even though the conventional flasher system may be used in combination with the auxiliary flasher system, the out-of-phase characteristics of the relays 136, 140 do not prevent the proper operation of the flash units 22. This is because the contacts 134 are in parallel with the contacts 138, 142 and thus the contacts 134 do not depend upon the relays 136, 140 to control operation of flash units 22.

It will be appreciated that the vehicle warning light system of the present invention provides an extremely effective technique to warn following drivers of an impending vehicle stop, slow-down, turn, or emergency condition. Because a brilliant flash occurs at the initiation of a braking action or a turn signal, the attention of a following driver quickly is captured and the following driver has sufficient time to react appropriately. Because the high-intensity lamps are flashed only once, the effect of the high-intensity lamps is not diminished by overuse. Even in this case, however, a repeated flashing is possible provided the brakes are pumped after a sufficient time has passed in which the flash units may be recharged.

The system has great flexibility, in part, because dimming circuits are provided to control the intensity of the flash lamps as a function of daytime or nighttime driving conditions. Moreover, the auxiliary and conventional emergency flasher systems can be used alone or in combination to provide an attention-getting signal that an emergency condition of some nature exists. The master switch also conveniently selectively disables the warning light system and the auxiliary emergency flasher indicator light provides a ready indication to the operator of the vehicle that the auxiliary warning light system is in operation.

Although the invention has been described with a certain degree of particularity, it is understood that the present disclosure of the preferred embodiment has been made only by way of example. Numerous changes in the details of construction of the warning light system and its associated circuitry may be resorted to without departing from the true spirit and scope of the invention.

I claim:

1. In a vehicle having a conventional headlight assembly, taillight assembly, and brake assembly, a method of warning a following driver, comprising the steps of:
   (a) disposing an auxiliary flash lamp at the rear of the vehicle, the flash lamp capable of producing a high-intensity light of short duration;
   (b) discharging the flash lamp in response to actuation of the brake assembly at the initiation of a braking operation; and
   (c) discharging the lamp again only after a predetermined period of time has passed and in response to actuation of the brake assembly upon the initiation of another braking operation.

2. The method of claim 1, comprising the additional step of disposing a high-intensity flash lamp adjacent each brake lamp.

3. The method of claim 2, comprising the additional steps of:
   (a) providing a turn signal assembly for the vehicle;
   (b) disposing a high-intensity flash lamp adjacent each front turn signal lamp; and
   (c) discharging the flash lamps on either side of the vehicle in response to actuation of the turn signal assembly at the initiation of a turn signaling operation and discharging the lamps again on that side only after:
  (i) a predetermined period of time has passed;
  (ii) the turn signaling operation is cancelled; and
  (iii) a subsequent turn signaling operation is initiated.

4. The method of claim 3, comprising the additional steps of:
  (a) providing an auxiliary flasher assembly for the vehicle; and
  (b) discharging all the high-intensity flash lamps periodically at a predetermined frequency in response to actuation of the auxiliary flasher assembly to indicate an emergency condition.

5. The method of claim 3, comprising the additional step of dimming the auxiliary flash lamps under nighttime driving conditions.

6. A warning light system for use in a vehicle, comprising:
  (a) a brake assembly;
  (b) a brakelight assembly having a lamp illuminated in response to actuation of the brake assembly; and
  (c) a flash lamp capable of producing a high-intensity light of short duration, the high-intensity lamp being flashed in response to actuation of the brake assembly at the initiation of a braking operation and being flashed again only after a predetermined period of time has passed and in response to actuation of the brake assembly upon initiation of another braking operation.

7. The apparatus of claim 6, wherein:
  (a) a brakelight assembly is disposed on either side of the vehicle; and
  (b) a high-intensity flash lamp is disposed adjacent each brake lamp.

8. A vehicle warning light system, comprising:
  (a) a power source;
  (b) brakelights disposed generally at the rear of the vehicle and in electrical communication with the power source;
  (c) a brake switch connected intermediate the brake lights and the power source to control illumination of the brake lights;
  (d) a high-intensity, electronic flash lamp disposed toward the rear of the vehicle and in electrical communication with the power source, the flash lamp comprising a lamp connected across capacitors and capable of producing a brilliant light on the order of 500,000 lumens for a period of approximately 30 milliseconds; and
  (e) a trigger circuit to discharge the flash lamp only once for every time the trigger circuit is energized, the trigger circuit being in electrical communication with the brake switch and energizable only when the brake switch is closed, whereby initiation of a vehicle braking operation closes the brake switch and results in illumination of the brake lights and substantially simultaneous discharge of the flash lamp and whereby the trigger circuit cannot be re-energized until the brake switch is closed again.

9. The warning light system of claim 8, wherein the trigger circuit comprises:
  (a) normally open contacts connected across the capacitors included as part of the flash lamp; and
  (b) an actuator operatively connected to the contacts to close the contacts, the actuator being in electrical communication with the brake switch.

10. The warning light system of claim 8, wherein a dimming circuit is disposed intermediate the flash lamp and the power source, whereby the brilliance of the flash lamp may be decreased under nighttime driving conditions.

11. A vehicle warning light system, comprising:
  (a) a power source;
  (b) a plurality of turn signal lights disposed generally at corners of the vehicle and in electrical communication with the power source;
  (c) a first flasher assembly connected intermediate the turn signal lights and the power source to control illumination of the turn signal lights, the first flasher assembly producing, in response to a steady input signal, a pulsed output signal having a frequency on the order of 60 to 100 cycles per minute;
  (d) a first flasher switch connected intermediate the first flasher assembly and the power source to control operation of the first flasher assembly;
  (e) a high-intensity, electronic flash lamp disposed adjacent each corner of the vehicle and in electrical communication with the power source, each flash lamp comprising a lamp connected across capacitors and capable of producing a brilliant light in the order of 500,000 lumens for a period of approximately 30 milliseconds;
  (f) a second flasher assembly connected intermediate the flash lamps and the power source to control illumination of the flash lamps, the second flash assembly producing, in response to a steady input signal, a pulsed output signal having a frequency on the order of 30 cycles per minute;
  (g) a second flasher switch connected intermediate the second flasher assembly and the power source to control operation of the second flasher assembly; and
  (h) a trigger circuit to discharge each flash lamp, the trigger circuit being in electrical communication with the second flasher assembly, whereby actuation of the first flasher switch causes the turn signal lights to flash simultaneously at a frequency of about 60 to 100 cycles per minute and actuation of the second flasher switch causes the flash lamps to flash simultaneously at a frequency of about 30 cycles per minute.

12. The system of claim 11, wherein the trigger circuit comprises;
  (a) normally open contacts connected across the capacitors included as part of the flash lamp; and
  (b) an actuator operatively connected to the contacts to close the contacts, the actuator being in electrical communication with the second flasher switch.

13. The system of claim 11, wherein a dimming circuit is disposed intermediate each flash lamp and the power source, whereby the brilliance of the flash lamps may be decreased under selected conditions.

14. A vehicle warning light system, comprising:
  (a) a power source;
  (b) a plurality of turn signal lights disposed generally at corners of the vehicle and in electrical communication with the power source;
  (c) a flasher assembly connected intermediate the turn signal lights and the power source to control illumination of the turn signal lights, the first flasher assembly producing, in response to a steady input signal, a pulsed output signal having a frequency on the order of 60 to 100 cycles per minute;

(d) a flasher switch connected intermediate the first flasher assembly and the power source to control operation of the flasher assembly;

(e) a high-intensity, electronic flash lamp disposed adjacent each corner of the vehicle and in electrical communication with the power source, each flash lamp comprising a lamp connected across capacitors and capable of producing a brilliant light on the order of 500,000 lumens for a period of approximately 30 milliseconds;

(f) a trigger circuit to discharge each flash lamp, the trigger circuit being in electrical communication with the flasher assembly; and (g) a turn signal switch to discharge the turn signal lights, the turn signal switch being connected intermediate the flasher assembly and the turn signal lights, the turn signal switch also being connected intermediate a portion of the trigger circuit and the flasher assembly, whereby actuation of the turn signal switch causes the turn signal lights and the flash lamps to be illuminated.

15. The system of claim 14, wherein the trigger circuit comprises:

(a) normally open contacts connected across the capacitors included as part of the flash lamp;

(b) normally closed contacts in series with the normally open contacts, the normally closed contacts opening faster than the normally open contacts can close;

(c) a first actuator operatively connected to the normally open contacts to close the contacts, the first actuator being in electrical communication with the turn signal switch; and (d) a second actuator operatively connected to the normally closed contacts to open the contacts, the second actuator being in electrical communication with the flasher assembly, whereby actuation of the turn signal switch alone will cause the turn signal lights to be illuminated and the flash lamps to flash but actuation of the flasher switch alone will cause only the turn signal lights to be illuminated.

16. The system of claim 14, wherein the flasher assembly pulses sufficiently frequently that the flash lamp capacitors cannot be recharged after the initial discharge.

17. The system of claim 14, wherein a dimming circuit is disposed intermediate each flash lamp and the power source, whereby the brilliance of the flash lamps may be decreased under selected conditions.

18. A vehicle warning light system, comprising:

(a) a power source;

(b) a plurality of turn signal lights disposed generally at corners of the vehicle and in electrical communication with the power source;

(c) a first flasher assembly connected intermediate the turn signal lights and the power source to control illumination of the turn signal lights, the first flasher assembly producing, in response to a steady input signal, a pulsed output signal having a frequency on the order of 60 to 100 cycles per minute;

(d) a first flasher switch connected intermediate the first flasher assembly and the power source to control operation of the first flasher assembly;

(e) brakelights disposed generally at the rear of the vehicle and in electrical communication with the power source;

(f) a brake switch connected intermediate the brake lights and the power source to control illumination of the brake lights;

(g) high-intensity, electronic flash lamps disposed generally at corners of the vehicle and in electrical communication with the power source, each flash lamp comprising a lamp connected across capacitors and capable of producing a brilliant light on the order of 500,000 lumens for a period of approximately 30 milliseconds;

(h) a trigger circuit to discharge the flash lamps, the trigger circuit being in electrical communication with the brake switch, whereby initiation of a vehicle braking operation closes the brake switch and results in illumination of the brake lights and substantially simultaneous discharge of the flash lamps disposed at the rear of the vehicle; and (i) a turn signal switch to discharge the turn signal lights, the turn signal switch being connected intermediate the flasher assembly and the turn signal lights, the turn signal switch also being connected intermediate a portion of the trigger circuit and the first flasher assembly, whereby actuation of the turn signal switch causes the turn signal lights and the flash lamps to be illuminated.

19. The system of claim 18, additionally comprising:

(a) a second flasher assembly connected intermediate the flash lamps and the power source to control illumination of the flash lamps, the second flash assembly producing, in response to a steady input signal, a pulsed output signal having a frequency on the order of 30 cycles per minute; and (b) a second flasher switch connected intermediate the second flasher assembly and the power source to control operation of the second flasher assembly, the second flasher assembly also being in electrical communication with the trigger circuit, whereby actuation of the first flasher switch causes the turn signal lights to flash simultaneously at a frequency of about 60 to 100 cycles per minutes and actuation of the second flasher switch causes the flash lamps to flash simultaneously at a frequency of about 30 cycles per minute.

* * * * *